(12) United States Patent
Murhed

(10) Patent No.: US 12,556,676 B2
(45) Date of Patent: Feb. 17, 2026

(54) IMAGE SENSOR, CAMERA AND IMAGING SYSTEM WITH TWO OR MORE FOCUS PLANES

(71) Applicant: SICK IVP AB, Linköping (SE)

(72) Inventor: Anders Murhed, Linköping (SE)

(73) Assignee: SICK IVP AB, Linköping (SE)

( * ) Notice: Subject to any disclaimer, the term of this patent is extended or adjusted under 35 U.S.C. 154(b) by 8 days.

(21) Appl. No.: 18/421,295

(22) Filed: Jan. 24, 2024

(65) Prior Publication Data
US 2024/0323338 A1  Sep. 26, 2024

(30) Foreign Application Priority Data
Mar. 21, 2023 (EP) .................................... 23163222

(51) Int. Cl.
*H04N 13/254* (2018.01)
*H04N 13/207* (2018.01)
(Continued)

(52) U.S. Cl.
CPC ......... *H04N 13/254* (2018.05); *H04N 13/207* (2018.05); *H04N 23/55* (2023.01); *H10F 39/806* (2025.01); *H04N 2213/001* (2013.01)

(58) Field of Classification Search
CPC ............... H04N 13/207; H04N 13/254; H04N 2213/001; H04N 23/55; G02B 13/0055; G02B 7/04
(Continued)

(56) References Cited

U.S. PATENT DOCUMENTS

2009/0212687 A1* 8/2009 Cok ...................... H10K 59/876
445/24
2010/0277638 A1* 11/2010 Craven-Bartle ....... H04N 23/55
348/340
(Continued)

FOREIGN PATENT DOCUMENTS

| CN | 101246233 A | * | 8/2008 | ............... B32B 7/12 |
| CN | 112307844 A | * | 2/2021 | ......... G06K 9/00046 |
| JP | H01276278 | | 11/1989 | |

OTHER PUBLICATIONS

CMOS Linear Image Sensor S13488, Japan, Hamamatsu Photonics K.K., May 2022.

*Primary Examiner* — Behrooz M Senfi
(74) *Attorney, Agent, or Firm* — DUANE MORRIS LLP; Gregory M. Lefkowitz; Daniel J. Tarr

(57) ABSTRACT

Image sensor (331; 531; 531') for use with a lens (340; 540') arranged to focus light onto an image sensing area (333; 533) of said image sensor (331; 531). Camera (330; 530'; 730) comprising the image sensor (331; 531; 531') and said lens (340; 540'). Imaging system (305; 705; 730) for three-dimensional imaging of an object (320; 720) based on light triangulation, comprising the camera. The image sensor (331; 531) comprising an optical plate (337; 537) arranged to cover the image sensing area (333; 533) by at least two optical plate portions (334-1, 334-2; 534-1, 534-2) with different refractive properties such that light incident from said lens (340; 540') and refracted by said optical plate portions (334-1, 334-2; 534-1, 534-2) towards and onto the image sensing area (333; 533) will travel different distances to be in focus on the image sensing area depending on which of said optical plate portions (334-1, 334-2; 534-1, 534-2) the light was refracted by. As a result, the image sensing area portions covered by said at least two optical plate portions (Continued)

(334-1, 334-2; 534-1, 534-2) become associated with different focus planes (351-1, 351-2; 751-1, 751-2).

8 Claims, 8 Drawing Sheets

(51) Int. Cl.
*H04N 23/55* (2023.01)
*H10F 39/00* (2025.01)

(58) Field of Classification Search
USPC .............................................. 348/46; 359/642
See application file for complete search history.

(56) References Cited

U.S. PATENT DOCUMENTS

| | | | |
|---|---|---|---|
| 2012/0168888 A1* | 7/2012 | Luan | H10F 39/804 |
| | | | 257/E31.127 |
| 2012/0206620 A1 | 8/2012 | Findlay | |
| 2015/0347799 A1 | 12/2015 | Gao | |
| 2018/0149854 A1 | 5/2018 | Siebenmorgen | |
| 2022/0030148 A1* | 1/2022 | Gruhlke | G02B 13/002 |

* cited by examiner

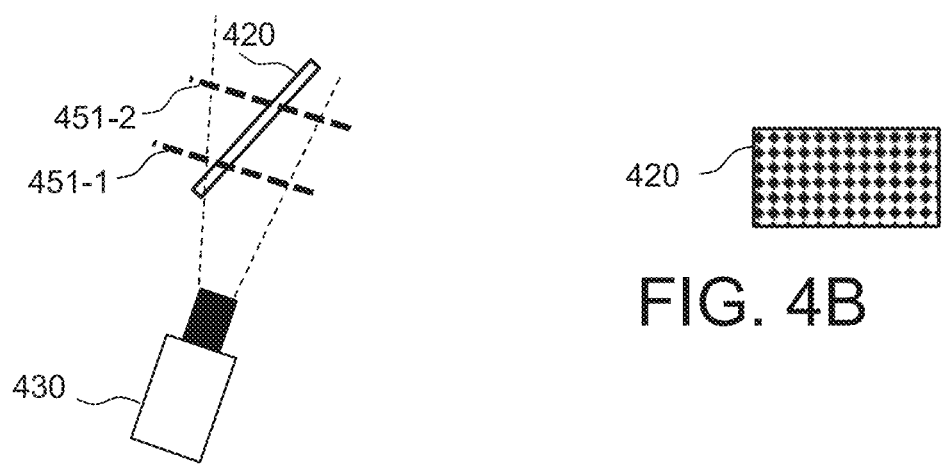
FIG. 4A
FIG. 4B
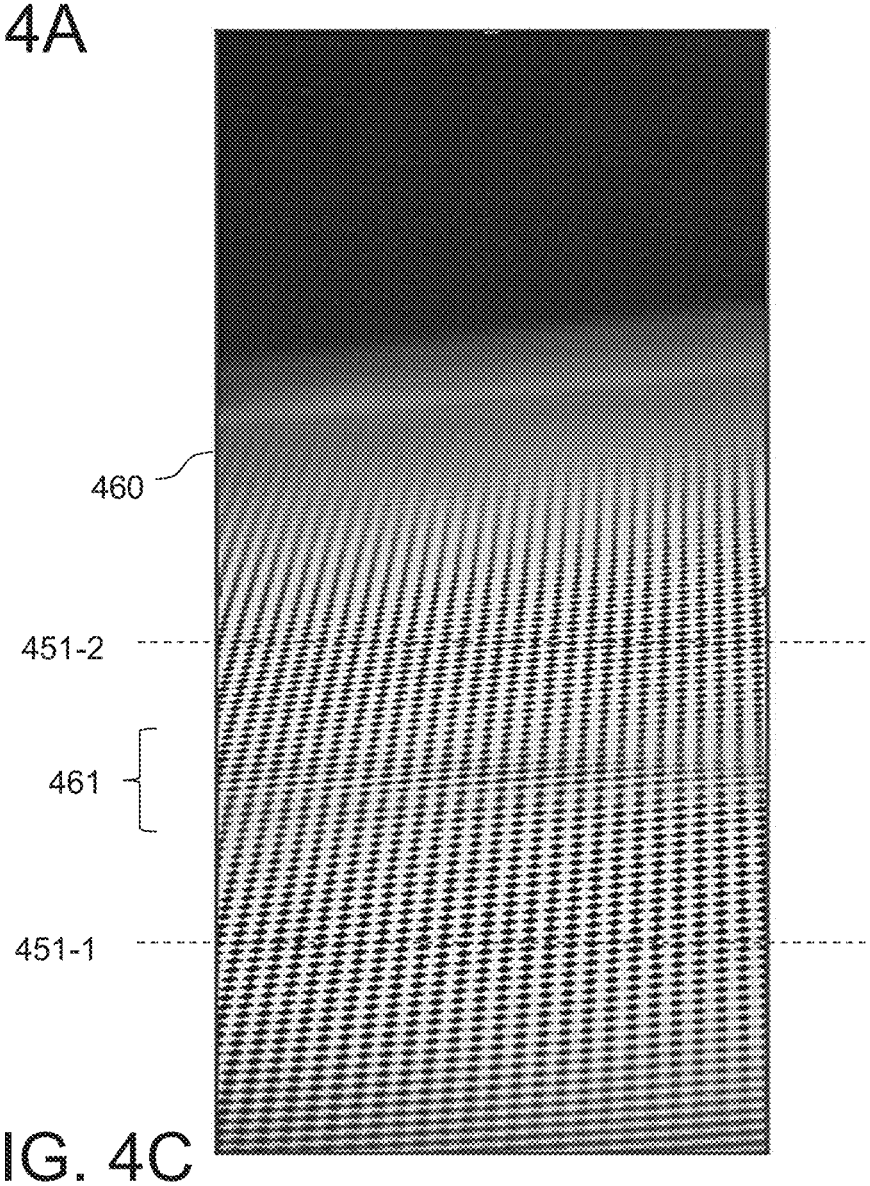
FIG. 4C

IMAGE SENSOR, CAMERA AND IMAGING SYSTEM WITH TWO OR MORE FOCUS PLANES

TECHNICAL FIELD

Embodiments herein concern an image sensor for use with a lens, a camera comprising the image sensor and lens, and an imaging system comprising the camera and configured for three-dimensional imaging based on light triangulation. More particularly, embodiments herein relate to focus planes associated with the image sensor and lens, the camera and the imaging system.

BACKGROUND

Industrial vision cameras and systems for factory and logistic automation may be based on three-dimensional (3D) machine vision, where 3D-images of a scene and/or object are captured. By 3D-images it is referred to images that comprise also "height", or "depth", information and not, or at least not only, information, such as intensity and/or color, regarding pixels in only two-dimensions (2D) as in a conventional image. That is, each pixel of the image may comprise information associated with the position of the pixel and that maps to a position of what has been imaged, for example a position on the object. Processing may then be applied to extract information on characteristics of the object from the 3D images and thereby provide 3D information about the object and that can be converted to various 3D image formats. Data with information about "height" or "depth" may be referred to as range data, where range data thus may correspond to data from height measurement of the object being imaged, or in other words from range or distance measurements of the object. Alternatively, or additionally, the pixel may comprise information on for example material properties, such as relating to the scattering of the light in the imaged area or the reflection of a specific wavelength of light.

Hence, a pixel value may relate to intensity of the pixel and/or to range data and/or to material properties.

Line scanned image data results when image data of an image is scanned or provided one line at a time, for example by a camera with a sensor configured to sense and provide image data, one line of pixels at a time. A special case of line scan image is image data provided by so called "sheet of light", such as laser-line, 3D triangulation. Laser is often preferred but also other light sources able to provide a "sheet of light", that is, a light plane, can be used, for example light sources able to provide light that do not spread out too much, or in other words, light that is "structured", for example light provided by a laser or Light Emitting Diode (LED).

3D machine vision systems are often based on light triangulation. In such a system there is a light source illuminating the object with a specific light pattern, such as the sheet of light as the specific light pattern resulting in a light, or laser, line on the object and along which line 3D characteristics of the object can be captured, corresponding to a profile of the object. By scanning the object with such a line, that is, performing a line scan, involving movement of the line and/or object, 3D characteristics of the whole object can be captured, corresponding to multiple profiles, and a 3D image of the object may be formed.

3D machine vision systems or devices that use a light plane for triangulation may be referred to as systems or devices for 3D imaging based on light, or light plane, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, for example corresponding to a laser line, that was reflected from the object. The position in the image of a detected peak will map to a position on the object from where the light that resulted in the peak was reflected.

A light triangulating camera system, that is, an imaging system based on light triangulation, thus typically projects a light line onto an object to create height profiles from the surface of an object. By moving the object relative to the cameras and light sources involved, information on height profiles from different parts of the object can be captured by images and then combined and used with knowledge of relevant geometries of the system to produce a three-dimensional representation of the object, i.e. 3D image data is provided. This technique may be described as grabbing of images of the light line when it is projected onto and reflected by the object towards the camera, and then from the images extract positions of the reflected laser line. This is normally accomplished by identifying positions of intensity peaks in the image frames, for example by using a conventional peak finding algorithm. Typically, but not necessary, the imaging system is setup so that intensity peaks relating to reflected light should occur and be expected per column of the sensor and the position within the column maps to height or depth.

An imaging system for 3D imaging based on light triangulation like above is typically configured to have a focus plane aligned with the light plane since it is within this plane the reflections from the object will occur, at different "heights" in the light plane. Normally for such camera, the image plane of the image sensor is perpendicular to the optical axis of the lens and the focus plane will be parallel to the image plane. This would require the camera to face the light plane so that the image plane and focus plane are parallel with the light plane as well. However, for the light triangulation purpose it is desirable to arrange the camera and line of sight with an angle in relation to the light plane. The so called Scheimpflug principle is therefore typically utilized for light triangulation systems to enable the focus plane to be aligned with the light plane. Hence, in such system, the image plane of the image sensor in the camera and the lens of the camera are configured, according to the Scheimpflug principle, in relation to how the camera will be positioned and view the light plane so that the focus plane will be aligned with the light plane. For conventional light triangulation application applications this works well and all reflections that occur in the light plane during scan of an object can be in focus on the image sensor.

SUMMARY

In view of the above, an object is to provide one or more improvements or alternatives to the prior art, such as providing improvements regarding focus for cameras of imaging systems, particularly for 3D imaging based on light triangulation.

According to a first aspect of embodiments herein, the object is achieved by an image sensor for use with a lens. The lens being arranged to focus light onto an image sensing area of said image sensor. Said image sensor comprises an optical plate, corresponding to an optical window or optical filter, arranged to cover the image sensing area by at least two optical plate portions. The optical plate portions have different refractive properties such that light incident from said lens and refracted by said optical plate portions towards and onto the image sensing area will travel different distances to be in focus on the image sensing area depending on which of said optical plate portions the light was refracted by. As a result, image sensing area portions covered by said at least two optical plate portions become associated with different focus planes.

According to a second aspect of embodiments herein, the object is achieved by a camera that comprises an image sensor according to the first aspect. The camera also comprises said lens. In some embodiments of the camera, the separate optical plate layer is stacked on the transparent protective layer with a space separating the layers for avoiding that said layers are in direct physical contact with each other. The separate optical plate layer is may in these embodiments be part of a separate lens part, or unit, of the camera that comprises the lens and is releasably, and/or is configured to be releasably, mounted to a housing part of the camera and which housing part comprises the image sensing area.

According to a third aspect of embodiments herein, the object is achieved by an imaging system for three-dimensional imaging of an object based on light triangulation, comprising the camera according to the second aspect. The imaging system may comprise a first light source for providing first light in the form of a first light plane for illuminating said object as part of said light triangulation. The camera with the image sensor may be arranged in the imaging system for capturing reflected first light from the object as part of said light triangulation. The imaging system may further be configured so that at least a first focus plane of said at least two focus planes is co-located with said first light plane.

Thanks to the additional one or more focus planes provided by embodiments herein, different parts of an object, at different depths within the field of view of the camera, can be in focus at the same time in the same image. This can for example be utilized in said imaging system based on light triangulation where the additional focus can be used to perform in focus imaging of other parts of the object at the same time as conventional light triangulation imaging. The additional in focus imaging may be regarding capturing of in focus 2D data of the object, or performing yet another light triangulation capture of image data from the object, for example to be able to perform faster total scan of the object and/or be able to detect unexpected movements that may occur between scans of the same positions of the object, thereby be able to avoid incorrect 3D representation of scanned objects.

Further, embodiments herein allow for simple implementation, for example with existing image sensors.

BRIEF DESCRIPTION OF THE DRAWINGS

Examples of embodiments herein are described in more detail with reference to the appended schematic drawings, which are briefly described in the following.

FIG. 1 schematically illustrates an example of a prior art imaging system that some embodiments herein may be based on.

FIG. 2A schematically illustrates a simplified example of a simplified prior at imaging system that embodiments herein may be based on.

FIG. 2B schematically illustrates a cross section of a prior art image sensor that some embodiments herein may be based on.

FIG. 4A schematically illustrates an imaging system setup with a camera according to some embodiments herein for imaging of an object having a dot patterned surface.

FIG. 4B schematically illustrates a front view of the object shown in FIG. 4A where the dot patterned surface is visible.

FIG. 4C shows an actual image taken by a corresponding real imaging system, camera and object as shown in FIGS. 4A-B.

DETAILED DESCRIPTION

Figure 1:
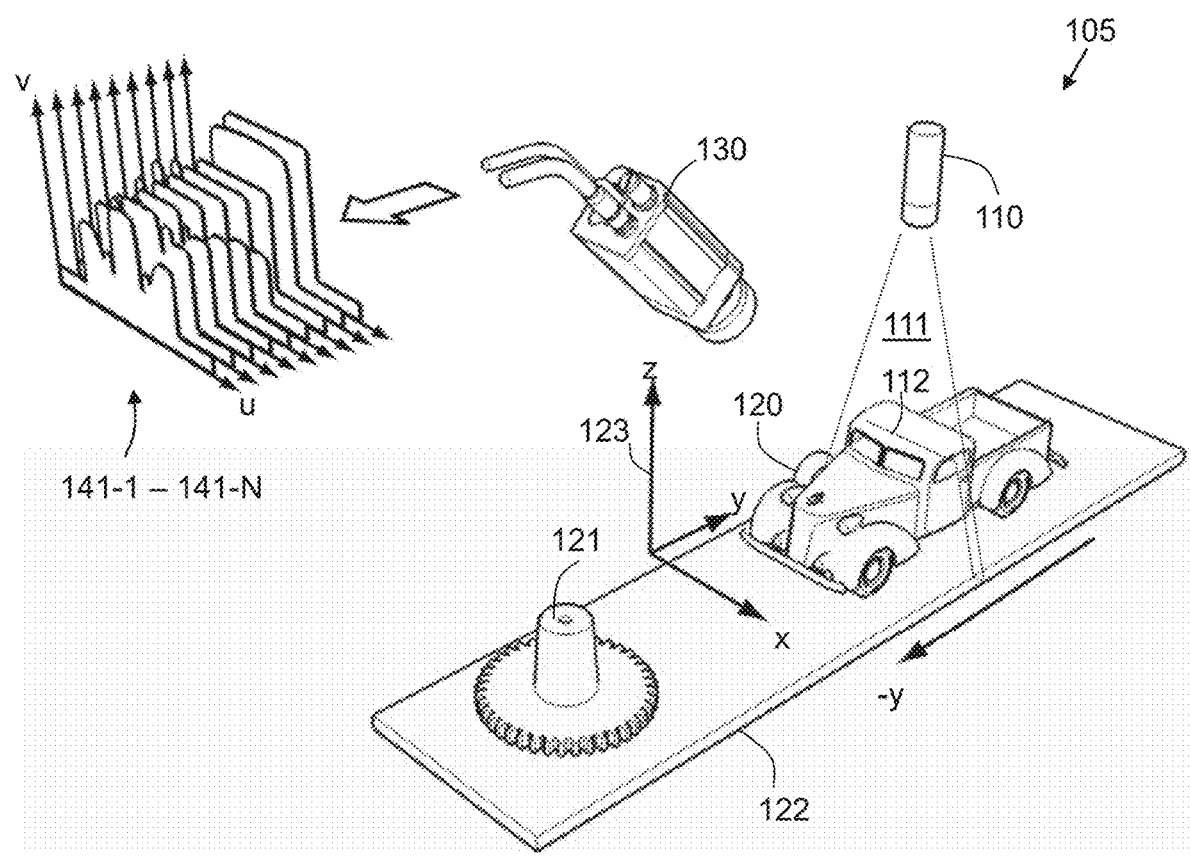

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Before going into details regarding different embodiments, the situation indicated in the Background will be further elaborated upon and the main principle behind embodiments herein be presented.

For conventional light triangulation applications, a single focus plane aligned with the light plane, as mentioned in the Background and based on the Scheimpflug principle, works well and all reflections that occur in the light plane during scan of an object can be in focus on the sensor. However, it has been identified situations and potential applications where it would be desirable to enhance the imaging capability and be able to additionally get focus also outside the light plane, for example in order to capture in focus 2D information, such as color, from the surface of an object that is being 3D imaged. It has been found difficult to create good focus for both light triangulation and the separate 2D image data in conventional systems. A light triangulation setup will typically have maximum focus only around the light plane using the Scheimpflug principle and it is typically desirable to use a large aperture opening to allow more of the light to reach the image sensor, narrowing the depth of focus.

Solutions to still be able to get focus outside the light plane could involve a further camera and/or lens, but this adds complexity. An additional camera also requires imaging from another angle, and separate images, for imaging the same thing, which may be undesirable in some cases.

Instead, a solution that embodiments herein are based on, is to create further one or more focus planes that exist and can be used at the same time by the same camera and image sensor. According to embodiments herein, this is accomplished by means of an optical plate arranged between the lens and the image sensing area, e.g. on the image sensing area, of the image sensor and that has at least two portions with different refractive properties so that light incident from said lens and refracted by said optical plate portions towards and onto the image sensing area, will travel different distances to be in focus on the image sensing area. As a result, the image sensing area portions covered by said at least two optical plate portions become associated with different focus planes, respectively. The different refractive properties may be caused by different thicknesses of the optical plate portions and/or by different refractive indices of materials that the optical plate portions are made of. Embodiments based on this allow for simple implementation with existing image sensors, such as in the form of an image sensor chip. An image sensor normally has a transparent protective layer, typically of glass, arranged on top of its image sensing, and thus light sensitive, area to protect the light sensitive pixel elements and electronics. An example of a simple implementation of embodiments herein based on a conventional image sensor is to add a further separate optical plate layer on top of the protective layer, where the combined layer form one of said optical plate portions, while the other of said optical plate portions will correspond to the part of the protective layer not covered by the separate optical plate layer. With knowledge of the lens, how the image sensing area is arranged in relation to the lens, and e.g. knowledge of where a first focus plane, without the separate optical plate layer, is located, it can be computed and/or found out by routine testing and experimentation, a suitable material and/or thickness of the separate optical plate layer to accomplish a further focus plane at a desirable distance further away from the first focus plane in relation to the camera with the image sensor. It may be preferred to use a further optical plate layer of the same material as the protective layer, for example glass with same refractive index, and use the thickness of the further optical plate layer to control where the further focus plane will be located.

Since, as clear from the Background, an application area of embodiments herein is in, and with, imaging system for 3D imaging based on light triangulation, such system and the prior art situation will be described and explained in some detail, before further details about embodiments herein are described in a light triangulation context. This will also facilitate understanding of benefits with embodiments herein when used with imaging system for 3D imaging based on light triangulation. Hence:

FIG. 1 schematically illustrates an example of an imaging system 105 for 3D imaging based on light triangulation as known from the prior art and will be used to explain the basic principles that such system is based on. The imaging system 105 may alternatively, for example, be named an imaging system for 3D machine vision based on light triangulation for capturing information on 3D characteristics of target objects. The imaging system 105 is in the figure shown in a situation of normal operation, that is, typically after calibration has been performed and the system is thus calibrated. The system 105 is configured to perform light triangulation, here in the form of sheet of light triangulation, that is, light triangulation where a light plane is used. The imaging system 105 further comprises a light source 110, such as a laser, for illuminating objects to be imaged with a specific light pattern, in the figure exemplified and illustrated as a light plane 111. The light may, but need not to be, laser light. The camera is typically configured and located so that it, based on the Scheimpflug principle, will have a focus plane co-located with, in other words, aligned with, the light plane 111, so that object reflections that occur in the light plane will be in focus in the image sensor. In the shown example, the target objects are exemplified by a first object 120 in the form of a car and a second object 121 in the form of a gear wheel construction. The objects that are imaged may be referred to as measure objects. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the light plane, results in a light line 112 on the first measure object 120. The specific light pattern 111 is reflected by the object, more specifically by portions of the object at the intersection, that is, at the light line 112 in the shown example. The imaging system 105 further comprises a camera 130 comprising an image sensor (not shown in FIG. 1). The camera and image sensor are arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the specific light pattern 111 will, at the light line 112 on a portion of the car roof of the first object 120, be reflected towards the camera 130 and image sensor, which thereby may produce and provide image data with information about said portion of the car roof. In accordance with the principle of light triangulation, with knowledge of the geometry of the measuring system 105, for example how image sensor coordinates relate to world coordinates, such as coordinates of a coordinate system 123, such as Cartesian coordinates, relevant for the object being imaged and its context, the image data may be converted to information on 3D characteristics, for example in the form of a 3D shape or profile, of the object being imaged in a suitable format. The information on said 3D characteristics may comprise data describing 3D characteristics in any suitable format.

By moving the light source 110 and/or the object to be imaged, such as the first object 120 or the second object 121, so that multiple portions of the object are illuminated and cause reflected light upon the image sensor, in practice typically by scanning the objects, image data describing a more complete 3D shape of respective object may be produced, for example corresponding to multiple, consecutive, profiles of respective object, such as the shown profile images 140-1-140-N of the first object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera 130 may be moved over the object, so that all portions of the object, or at least all portions facing the light source 110, are illuminated and the camera receives light reflected from all parts of the object desirable to image.

As understood from the above, an image frame provided by the camera 130 and its image sensor, for example imaging the first object 120, may correspond to any one of the profile images 140-1-140-N. Each position of the contour of the first object shown in any of the profile images 140-1-140-N are typically determined based on identification of intensity peaks in image data captured by the image sensor and on finding the positions of these intensity peaks. The imaging system 100 and conventional peak finding algorithms are typically configured to, in each image frame, search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such "clean" profile image as shown in the figure, and the total of image frames and profile images can be used to create a 3D image of the first object 120.

Figure 2A:
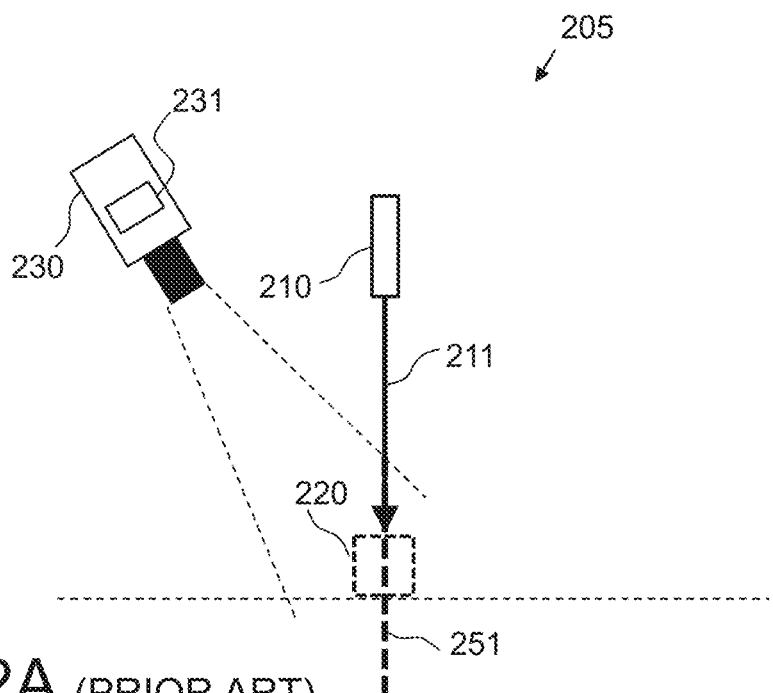

FIG. 2A schematically illustrates a simplified example of a prior at imaging system 205 that embodiments herein may be based on. The shown system may correspond to the imaging system 105 but is shown in an even more schematic and simple view. Details shown in the figure are to facilitate understanding of and for later comparison with embodiments herein presented further below. The shown imaging system 205 can be considered to correspond to a basic configuration and comprises: A first light source 210 for illuminating an object 220 with first light 211, typically laser light, as part of light triangulation for 3D imaging of the object 220. The first light 211 is provided in the form of a light plane. The object may be named target or measure object. A camera 230 with image sensor 231 arranged for sensing reflected first light from the object 220 as part of said light triangulation for the 3D imaging, that is, configured and positioned in relation to each other for the light triangulation. This typically involves that the first light source 210 and the camera 230 are arranged at predetermined fixed positions and with known relations to each other for the light triangulation. The camera 220 has a field of view covering the light plane at least partly, particularly a portion thereof where the object 220, and other objects the system is configured to image, may intersect the light plane.

The imaging system 205 is in the example set up and configured based on the Scheimpflug principle so that there is a focus plane 251 co-located with, thus aligned, with the light plane corresponding to the first light 211, which, as mentioned above, typically always is the case for prior art light triangulation-based imaging systems.

Another example of structured light that can be used as the first light in embodiments herein, as an alternative to laser light or laser plane, and that is not what conventionally may be referred to as a light plane but corresponding to such with similar effect, is a light edge, that is, an edge of an area with illumination.

The object 220 is thus illuminated and images may be captured as in conventional light triangulation, which may involve movement of the first light source 210 and/or the measure object 220 in relation to each other, so that at different consecutive time instants, different consecutive portions of the object 220 are illuminated by the first light source 210 and the first light 211, and reflected light is sensed by the camera 230 and image sensor 231. The camera 230 may be a prior art camera and the image sensor 231 be a prior art image sensor 231.

Image frames and/or information derived from image frames provided by the camera 230 and the image sensor 231 may be transferred, such as transmitted, for further processing outside the camera 230, such as to a computing device (not shown), for example computer or similar. Such further processing may additionally or alternatively be performed by a separate computing unit or device (not shown), that is, separate from the image processor 231, but still comprised in, such as integrated with, the camera 230, or a unit comprising the camera 230. The computing device (not shown) may be configured to control devices involved in the light triangulation and/or involved in other actions.

As mentioned above, the imaging system 205 may, at least regarding light triangulation, correspond to the system 105 in FIG. 1, that is, regarding light source, camera, image sensor, how they are positioned in relation to each other and to the measure object, how the system is configured to move and image measure object(s) etc. Hence, the camera 230 and first light source 210 may be fixed in relation to each other and the system configured to move the object 220 in relation to these. Through said sensing by the image sensor 231, a respective image frame is associated with a respective time instant of when the image frame was sensed, that is, captured, and with a respective portion of the measure object 220 from which the image sensor 231 sensed reflected first light 211 at the respective time instant.

The object 220 is shown located within field of view of the camera 230. The first light source 210 is configured to illuminate the measure object 220 with the first light 211 so it is reflected by the object 220 and the reflected first light is captured by the camera 230 and the image sensor 231 as part of said light triangulation.

Figure 2B:
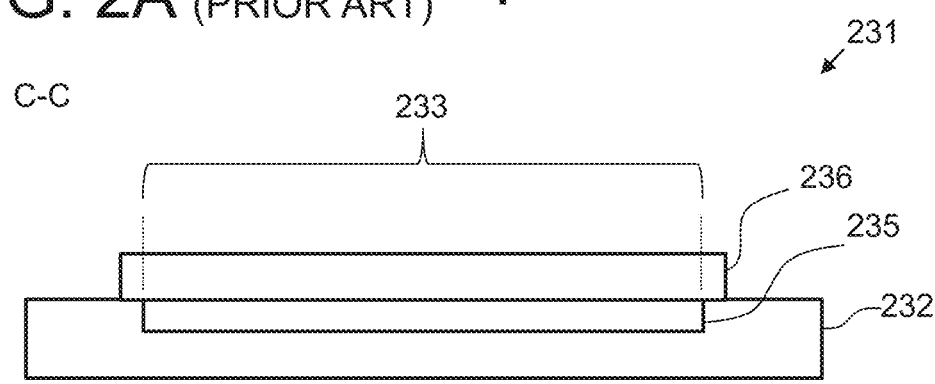

FIG. 2B schematically illustrates the image sensor 231 in a cross-section C-C. The image sensor 231 may thus be a prior art image sensor and, at least that some embodiments herein, as explained below, are based on such prior art image sensor with some additions.

Figure 2C:
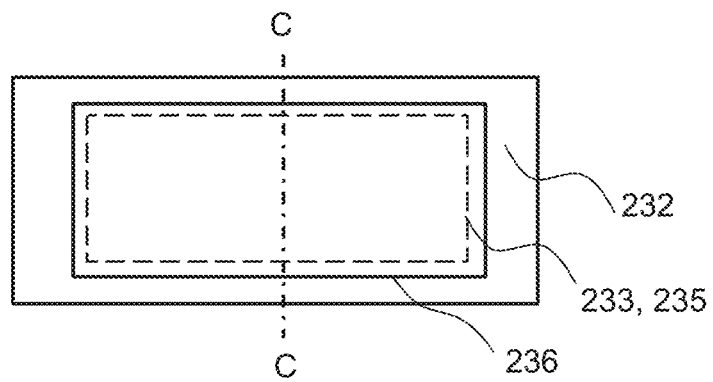
FIG. 2C schematically illustrates a top view of the prior art image sensor in FIG. 2B with the cross section marked out.

FIG. 2C schematically illustrates a top view of the image sensor 231 with the cross-section C-C marked out.

The image sensor 231, for example in the form of an image sensor chip, has an image sensing area 233 that is part of an image sensing part 235 with light sensitive pixel elements. The image sensing part 235 is formed and/or arranged on or in a support structure 232, for example image sensor substrate. The image sensing area 233 of the image sensing part 235 is covered by a transparent protective layer 236, typically of glass, to prevent damage to the image sensing 233 and image sensing part 235 while yet allowing light and an image to be sensed. Although not shown in the figure, there is typically a small space, that is, empty gap, between the transparent protective layer 234 and the image sensing area 233. As can be seen in the top view of FIG. 2B, the protective layer 234 may extend with some margin outside the image sensing part 233 of the image sensing part 235, such as over, and/or be supported by, the support structure 233 that it also may be attached to.

Figure 3A:
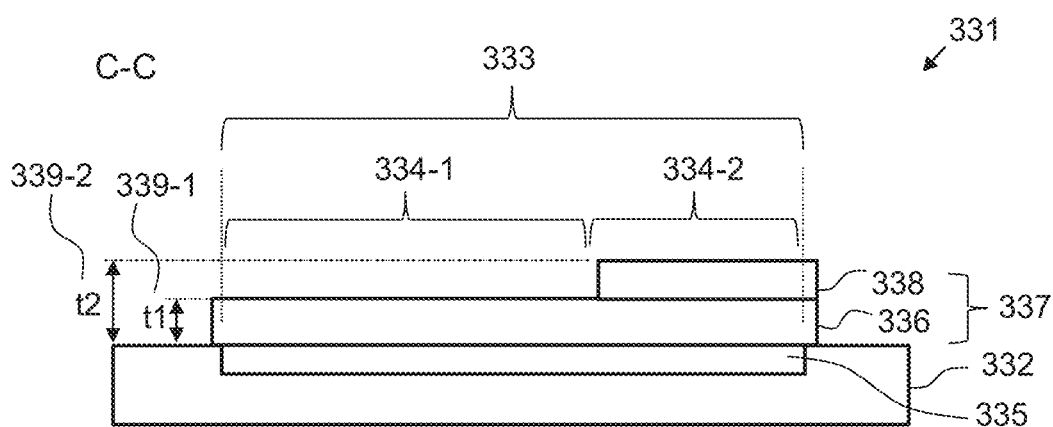
FIG. 3A schematically illustrates a cross section of a first exemplifying image sensor according to some embodiments herein.

FIG. 3A schematically illustrates a first exemplifying image sensor 331 according to some embodiments herein, in a corresponding cross section C-C as for the prior art image sensor 231 in FIG. 2B to facilitate comparison and identification of differences.

Figure 3B:
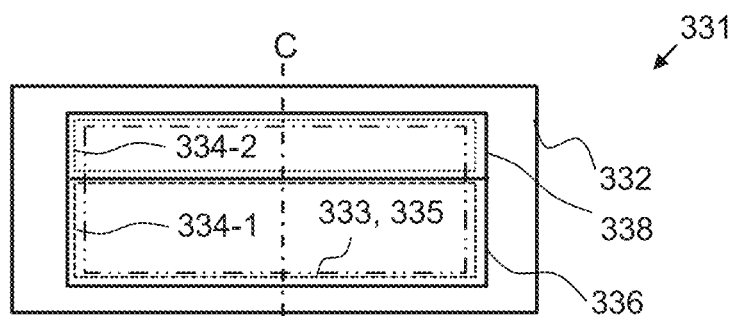
FIG. 3B schematically illustrates a top view of the image sensor in FIG. 3A with the cross section marked out.

FIG. 3B schematically illustrates a top view of the image sensor 331 in FIG. 3A with the cross-section C-C marked out.

Figure 3C:
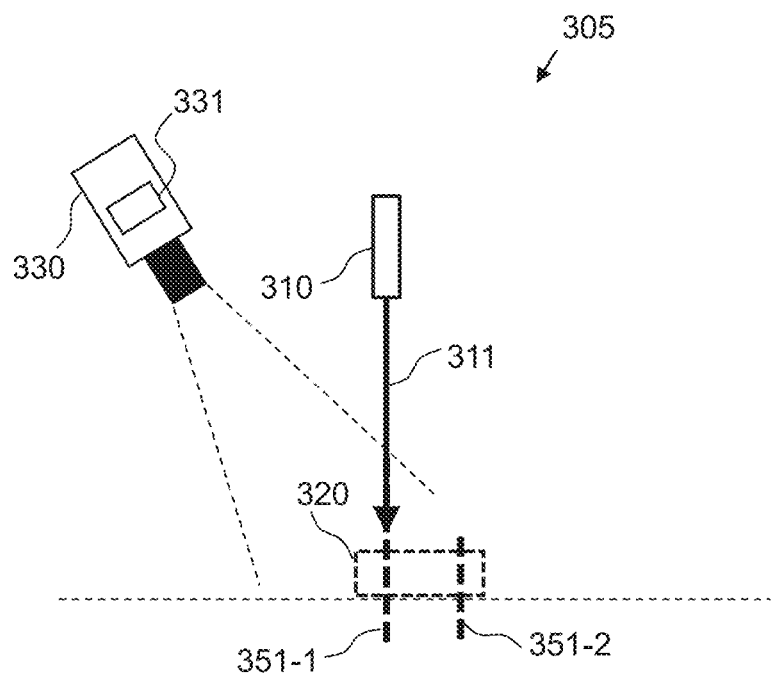
FIG. 3C schematically illustrates a simplified first example of an imaging system according to some embodiments herein and comprising a camera with the image sensor in FIGS. 3A-B.

FIG. 3C schematically illustrates a simplified first example of an imaging system 305 according to some embodiments herein and that comprises a camera 330 with the image sensor 331 and a first light source 310 for illuminating the object 320 with first light 311, typically laser light, as part of light triangulation for 3D imaging of the object 320. The first light 311 is provided in the form of a light plane. The camera 330 and the image sensor 331 are arranged for sensing of reflected first light from the object 320 as part of said light triangulation. The imaging system 305 is set up and configured based on the Scheimpflug principle such that a first focus plane 351-1 is co-located with, thus aligned, with the light plane corresponding to the first light 311.

Focus will in the following be on differences compared to the image sensor 231 and imaging system 205 in FIGS. 2A-C, that is, regarding what is new in FIGS. 3A-C. Hence, corresponding parts shown in both FIGS. 2A-C and FIGS. 3A-C may be the same.

As already mentioned, embodiments herein may be formed based on an existing image sensor according to the prior art, for example by adding or replacing layer(s) on top of the image sensing area of such existing image sensor.

A main structural difference between the image sensor 331 and the image sensor 231 is an added separate optical plate layer 338 stacked on a transparent protective layer 336. In addition to the separate optical plate layer 338, the transparent protective layer 336, the image sensor 331 also comprises an image sensing part 335 with an image sensing area 333, and a support structure 332. Hence, except for the separate optical plate layer 338, the rest of the parts of image sensor 331 as show in the figure may be as their counterparts in FIG. 2B-C, that is, the image sensor 331, and thus an image sensor according to embodiments herein, may be formed by modification of a prior art, such as conventional, image sensor by adding of a separate optical plate layer 338 that at least partly covers the image sensing area and that may be arranged on an existing transparent protective layer covering the image sensing area. Details about various embodiments herein, as well as further explanations, will be discussed and disclosed below.

The separate optical plate layer 338 may simply be an additional layer of the same material as the transparent protective layer 336, such as of glass. It may be preferred to attach the separate optical plate layer 338 with an optical glue to the transparent protective layer 336, which optical glues should have the same refractive index as the separate optical plate layer 338 and/or the transparent protective layer 336. The same refractive index means that less different refractions will occur and need to be considered. It may thereby suffice to design the separate optical plate layer 338 with focus on its thickness to achieve a desirable result, that is, to form a further focus plane at a desirable offset distance from the focus plane that is provided without the separate optical plate layer 338. This is further explained below. As used herein, optical glue refers to a glue that is transparent and has optical properties as glass, at least after it has been applied and hardened.

The optical plate layer 338 and the transparent protective layer 336 just being in physical contact, for example by just clamping them together, without the optical glue will typically cause undesirable, and for the imaging detrimental, optical interference patterns. An alternative to optical glue is to arrange them with a small space in between, that is, an empty gap or space between the layers for avoiding physical contact, in other words a gap similar as typically is the case between transparent protective layer 336 and the image sensing area 333. A solution with such gap and what may be a suitable gap will be further discussed and exemplified below.

The separate optical plate layer 338 results in that it is no longer only the protective layer 336 with its thickness t1 339-1 that covers the image sensing area 333, which now instead is covered by both the separate optical plate layer 338 and the protective layer 336 that together form an optical plate 337. There are two areas, or portions, with different layer thicknesses, corresponding to a first optical plate portion 334-1 and a second optical plate portion 334-2, that cover the image sensing area 333 of the image sensing part 335. The first optical plate portion 334-1 here corresponds to the portion of the image sensing area 333 not covered by the separate optical plate layer 338 and that thus is covered only by the transparent protective layer 336. Light incident on said first portion is refracted by, and travels through the thickness, named t1 339-1, of the transparent protective layer 336 to reach the image sensing area 333 of the image sensing part 335. In the shown example, the second optical plate portion 334-2 corresponds to the portion of the image sensing area 333 that is covered by the separate optical plate layer 338 and that thus is covered by both this layer and the transparent protective layer 336. Light incident on the second portion is refracted by, and travels through a, a layer with a thickness named t2 339-2, corresponding to thicknesses of both the separate optical plate layer 338 and the transparent protective layer 336, before reaching the image sensing area 333 of the image sensing part 335.

Note that in FIG. 3B the image sensing area 333 and the optical plate portions 334-1, 334-2 are drawn with some offset and slightly different scale in relation to each other. This is done only to be able to visually separate the area and portions from each other in the figure.

Even if the separate optical plate layer 338 is of the same material as the transparent protective layer 336, as mentioned above, the thickness difference between t1 339-1 and t2 339-2 means that the two optical plate portions 334-1, 334-2 will have different refractive properties, that is, same light will be refracted in different ways onto the image sensing area 333 depending on which optical plate portion the light was refracted by and passed through. To be more specific, since also frequency and wavelength of incident light affects how light is refracted, incident light, even of the same frequency (or wavelength) and same angle of incidence onto respective optical plate portion, will be refracted a bit differently towards and onto the image sensing area 383. However, the difference in refraction due different frequencies of the light can be considered neglectable under most practical operational circumstances for embodiments herein, as should be realized. The effect is still mentioned since it is a factual circumstance. That light of different frequencies of light rays with different angle of incidence is refracted differently is of course nothing new and the effect is also present in prior art imaging systems, for example the imaging system 205.

As should be realized by the skilled person, the light incident on the image sensing area 333 comes from a lens of the camera, such as the camera 230 or 330, although such lens is not shown in FIGS. 2, 3. The difference in how light is refracted by said optical plate portions manifests as an "offset" in focus. In other words, depending on which optical plate portion the light is refracted by and passes through, it will travel different distances to be in focus on the image sensing area 333. This is explained further below in connection with FIGS. 3D-E. As a result, image sensing area portions covered by said at least two optical plate portions become associated with different focus planes, respectively. That is, in the shown example, there will be two focus planes:

a first focus plane 351-1 associated with the first optical plate portion 334-1 and the part of the light sensing area 333 covered by the first optical plate portion 334-1, and a second focus plane 351-2 associated with the second optical plate portion 334-2 and the part of the light sensing area 333 covered by the second optical plate portion 334-2.

The first focus plane 351-1 will of course be the same as without the separate optical plate layer 338. If only the separate optical plate layer 338 differs between the imaging systems 205 and 305, the first focus plane 351-1 will thus be the same as the focus plane 251. The second focus plane 351-2 will be further away, that is, further away from the camera 330, than the first focus plane 351-1, as is also illustrated in the figure.

When the imaging system 305 is set up for light triangulation and configured based on the Scheimpflug principle so that the first focus plane 351-1 is co-located with, thus aligned, with a light plane corresponding to a first light 311 used for the light triangulation and provided by a light source 311, the second focus plane 351-2 will be, at least substantially, parallel with the first focus plane 351-1.

In principle, any offset distance can be accomplished based on embodiments herein and this makes embodiments herein suitable for a great variation of application areas and field of views.

As used above and herein, optical plate refers to an optical window or optical filter. Optical filter refers to that there is a filtering effect regarding certain light, for example light of certain frequencies or wavelengths, that else would pass through, that is, if such frequencies or wavelengths are present in the light, they are being removed when passing the optical plate. Optical window refers to a case with no such filtering effect.

It is realized that embodiments as discussed above in connection with FIGS. 3A-C can be implemented quite easily. It may for an existing prior art imaging system, such as the imaging system 205, for example that uses a prior art image sensor, be determined or selected where an additional, second, focus plane would be desirable to be located, at a certain offset distance away from where the existing focus plane is located. It is then just about adding a separate optical plate layer, such as the separate optical plate layer 338, with a thickness that accomplishes the second focus plane. It also should be determined which part, or portion, of the image sensing area 333 that is to be used with the additional focus plane and then cover this portion by the separate optical plate layer. Finding the thickness that accomplishes the second focus plane at the desirable offset distance can be accomplished through routine testing and experimentation and/or based on knowledge about the camera, including about the lens and how and where it is arranged in relation to the image sensor, which enable to compute the thickness.

The basic principles behind embodiment herein and the focus plane offset that the further, second, focus plane will have, are discussed next.

Figure 3D:
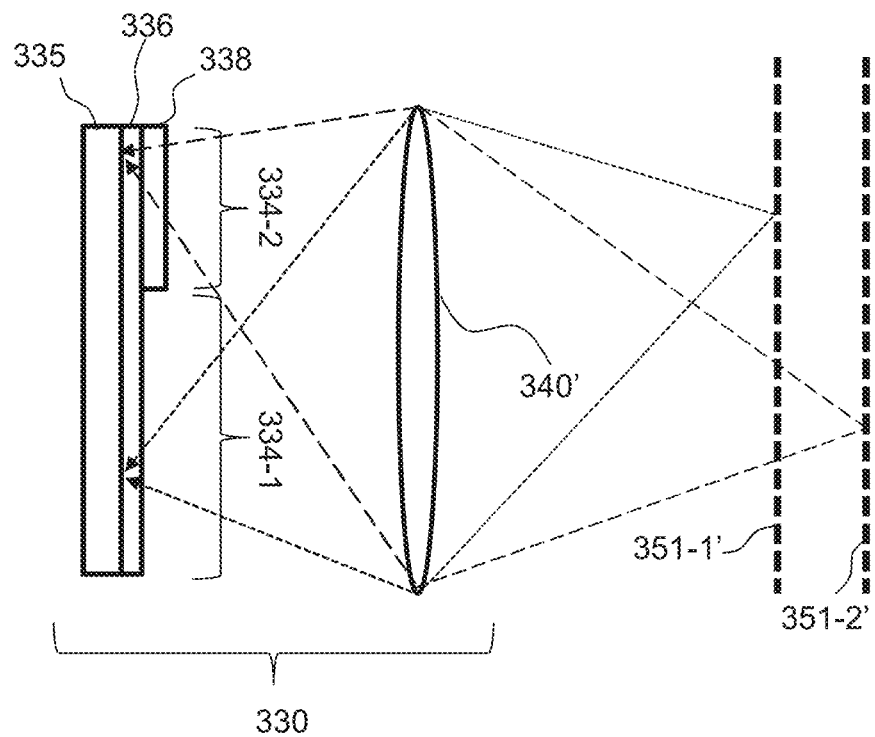
FIG. 3D schematically illustrates a simplified example how two focus planes may relate to the image sensor in FIGS. 3A-B and a lens, for example as part of a camera.

FIG. 3D schematically illustrates a simplified example of how two focus planes, a first focus plane 351-1' and a second focus plane 351-2', may relate to the image sensor 331 in FIGS. 3A-B and to a lens 340 of the camera 340. Note that what is shown in figure is without application of the Scheimpflug principle and thus the shown example is not directly corresponding to the situation shown in FIG. 3C. The focus planes 351-1' and 351-2' are thus not the same as the focus planes 351-1 and 351-2. The figure serves the purpose of illustrating the underlying principle of additional focus plane with offset, which is easier to explain and understand without at the same time involving Scheimpflug.

The figure shows that light from a point in the first focus plane 351-1' will be in focus on a point on the image sensing area 333 not covered by the separate optical plate layer 338, that is, a point on the image sensing area 333 reached by light refracted through the first optical plate portion 334-1. The figure also shows that light from a point on the second focus plane 351-2' will be in focus on a point on the image sensing area 333 covered by the separate optical plate layer 338, that is, a point on the image sensing area 333 reached by light refracted through the second optical plate portion 334-2.

Figure 3E:
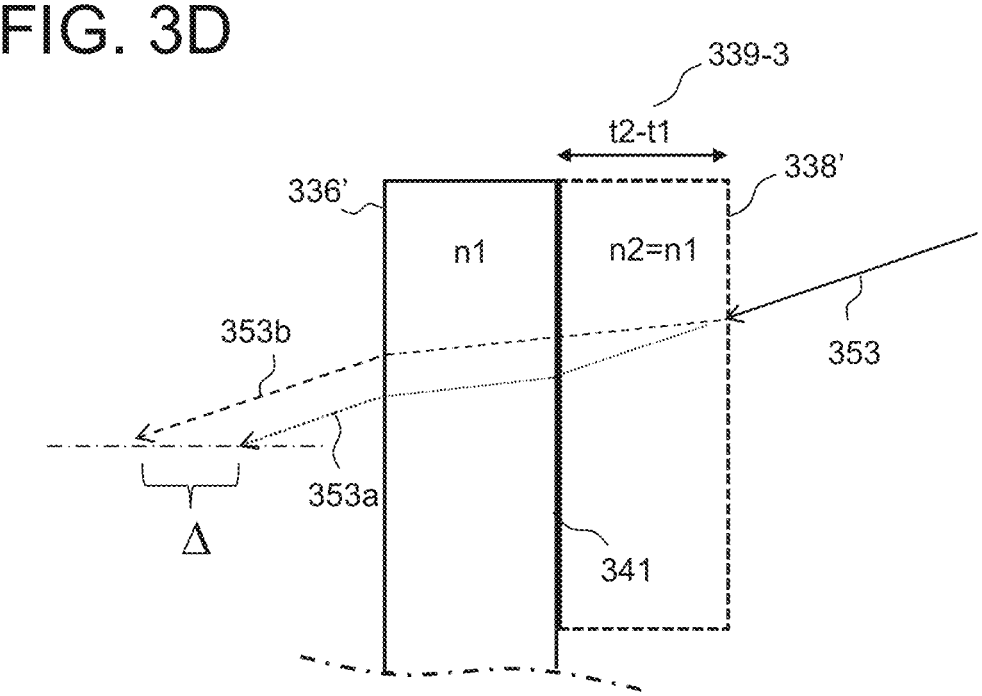
FIG. 3E schematically illustrates how a light ray is affected by a thicker optical plate portion vs. a thinner optical plate portion.

FIG. 3E is an example to provide support for understanding how and why this will be case, that is, how and why there will be formed another second focus plane. This can be understood from studying how a single light beam would be refracted with and without the separate optical plate layer 338. In other words, FIG. 3E schematically illustrates how one and the same light ray, in the example a single incident light ray 353, would be affected by a thicker optical plate portion vs. a thinner optical plate portion. In the figure there is shown a first transparent layer 336' that may correspond to the transparent protective layer 336 and a second transparent layer 338', that may correspond to the separate optical plate layer 338.

As can be seen in the figure, some basic assumptions has been made to simplify the example, for example, it has been assumed that the first transparent layer 336' and the second transparent layer 338' are of material more optically dense than the medium that the light ray 353 travels through before reaching said layers, for example as in the case with layers of glass located in air, which typically is the cases for an image sensor in a camera. It has also been assumed that the layers are of the same material, such as glass, or at least of materials having the same refractive index. For example, if the first transparent layer 336' is of a material with refractive index n1 and the second transparent layer 338' is of a material with refractive index n2, n2=n1. When both layers are present, for example corresponding to the separate optical plate layer 338 attached to the transparent protective layer 336, they may, as mentioned above, be attached to each other by means of an optical glue, or more generally, by a transparent attachment medium 341, with same refractive index as the layers to avoid undesirable reflections and refractions in the contact interface.

First consider how the single incident light ray 353 would be affected if the second transparent layer 338' would not be present, that is, corresponding to a situation without the separate optical plate layer 338. The light beam 353 will then be refracted when it reaches the first transparent layer 336' and will pass through the thickness of that layer before refracting out on the other side of the layer. The light beam 353 will in this situation travel according to a first light ray path 353a as shown in the figure.

Then consider the same single incident light ray 353 but in a situation with presence of the second transparent layer 338', that is, corresponding to a situation with the separate optical plate layer 338. The light beam 353 will then be refracted when it reaches the second transparent layer 338' and will pass through the thickness of both the second transparent layer 338' and the first transparent layer 336, until it refracts out on the other side. The light beam 353 will in this situation travel according to a second light ray path 353b shown in the figure.

It can clearly bee seen that the result is an offset Δ between the light ray paths 353a-b. The offset Δ explains how said offset distance between focus planes can be formed as discussed above, or in general, how there can be formed different focus planes as result from an optical plate covering the image sensor where the optical plate has different optical plate portions with different refractive properties. For example, different thicknesses and/or with different optical densities, such as from material(s) with different refractive indexes.

Note that even though the offset Δ explains further focus plane(s) and offset distance between focus planes, the offset distance between focus planes is also affected by the lens used, such as the lens 340', its properties, how and where it is located in relation to the image sensor, for example the image sensor 330.

FIG. 4A schematically illustrates an imaging system setup with a camera 430 according to some embodiments herein for imaging of an object 420 with a flat dotted surface. The camera 430 has an image sensor (not shown) corresponding to the image sensor 330, and thus there are two different focus planes 451-1, 451-2 associated with two different image sensing area portions of the image sensor of the camera 430.

The object is placed in relation to the camera 430 so that the camera 430 can image the dotted surface of the object 420 as it extends away from the camera 430 within its field of view, that is, the camera 430 and object 420 are arranged so that the camera can image the doted surface at different depths.

FIG. 4B schematically illustrates a front view of the object 430 shown in FIG. 4A where the dotted surface is visible.

FIG. 4C shows an actual image 460 taken by a corresponding real imaging system, camera and object as shown in FIGS. 4A-B and thus result from a real implementation of embodiments herein. The figure illustrates the effect of the two focus planes in an image. Dotted lines have been drawn in the figure to indicate parts that are in focus. Respective dotted line is thus associated with a respective one of the focus planes 451-1, 451-2. It can clearly be seen that there are two areas in the image with focus, each area centered around respective dotted line. The figure also indicates location of a distorted or blurred area 461 in the image 460. The blurred area 461 is between the focus planes 451-1 and 451-2 and is explained by edge effects where the two different image sensing area portions meet, for example located around the edge of the separate optical plate layer 338 on top of the transparent protective layer 336.

Figure 5A:
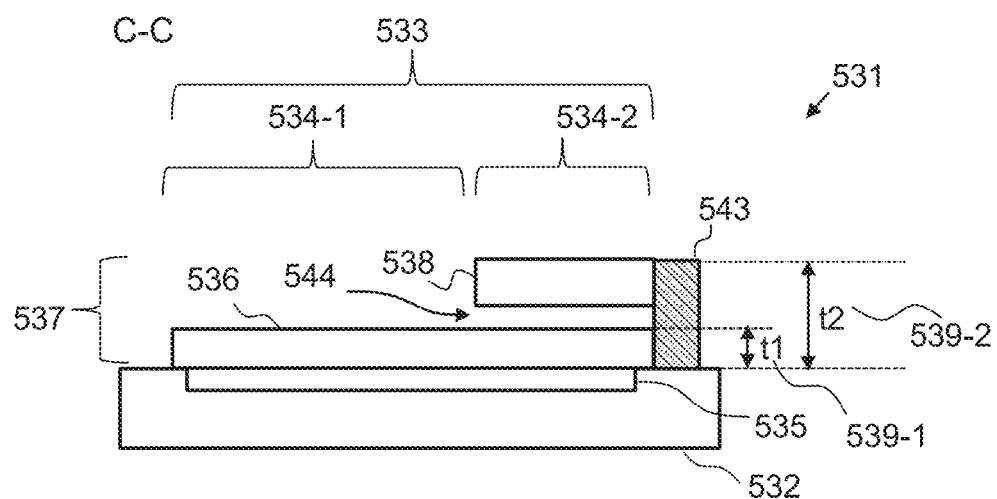
FIG. 5A schematically illustrates a cross section of a second exemplifying image sensor according to some embodiments herein.

FIG. 5A schematically illustrates a cross section of a second exemplifying image sensor 531 according to some embodiments herein, in a corresponding cross section C-C as for the prior art image sensor 231 in FIGS. 2B-C and the image senor 331 in FIGS. 3A-B to facilitate comparison and identification of differences.

Figure 5B:
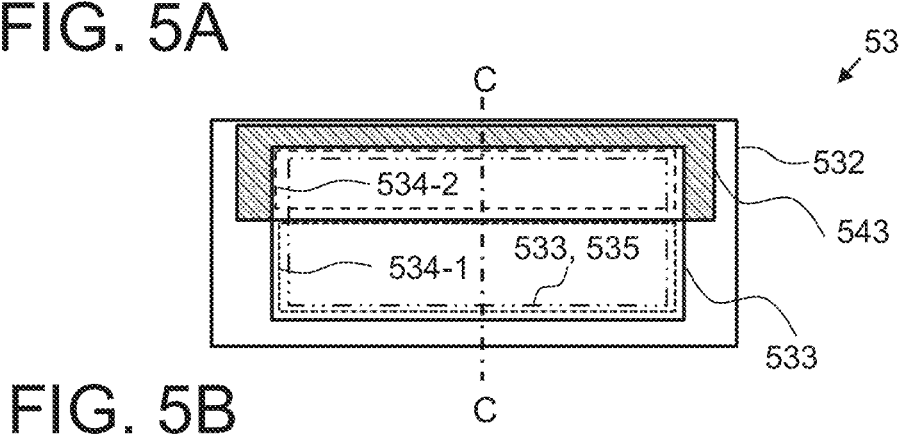
FIG. 5B schematically illustrates a top view of the image sensor in FIG. 3A with the cross section marked out.

FIG. 5B schematically illustrates a top view of the image sensor 531 in FIG. 5A with the cross-section C-C marked out.

Focus will in the following be on differences compared to the image sensor 331 and, that is, regarding what differs. Hence, corresponding parts looking the same, with corresponding numerals, not mentioned as a differing part, may be the same in FIGS. 5A-B as in FIGS. 3A-B.

What is shown in FIGS. 5A-B relates to embodiments with a separate optical plate layer 538 stacked on a transparent protective layer 536 but without using a transparent attachment medium, such as an optical glue as in the previous example. Instead, the layers are arranged with a small space 544, that is, gap, separating the layers, thereby avoiding that said layers are stacked with direct physical contact. Reason for this is as already indicated above, to avoid undesirable interference phenomenon in the contact interface of the layers. The space 544 may be as small as possible that can be accomplished in practice although the space 544 should typically be larger, and preferably substantially larger, that is, several times, larger than the wavelengths of the light to be sensed, that is, typically larger than 400 nm-1000 nm. However, it is in any case typically difficult to accomplish a space between layers that is smaller than in the size of tenths of micrometers, such as below 50 μm. In practice a suitable space may be in the range of 50-100 μm. There is no clear benefit with a larger space so it may be beneficial to keep it small. It is realized that a larger gap also will contribute to a larger area between focus planes, that may result in a distorted of blurred part of the image, such as the blurred area 461 mentioned in relation to FIG. 4C.

In addition to the separate optical plate layer 538 and the transparent protective layer 536, the image sensor 531 comprises an image sensing area 533 of an image sensing part 535 and a support structure 532. In the shown example there is a holder arrangement 543 for the separate optical plate layer 538 so that this layer is stacked with said space separating it from the transparent protective layer 336. The separate optical plate layer 538 is hold by and/or attached to the holder arrangement 543, for example mechanically, such as by being clamped, and/or glued. Note that what is shown in the figure is just an example, there are of course several other types of holder arrangements possible and other ways how a separate optical plate layer can be hold by and/or be attached by a holder arrangement or similar, such as a fixture or frame structure. Such other type of holder arrangement may be attached, such as glued, to the image sensor outside and/or at the perimeter of the image sensing area, or at least outside a part there of that is used for the imaging. If the image sensing area 533 and possibly also the transparent protective layer 536, are not flush with the surface of the support structure 532, or similar, as shown for simplifying reasons in the examples herein, but recessed below it with a small offset corresponding to the space 544, it is realized that that the separate optical plate layer 538, can be attached directly to the surface of the support structure 532. Another possibility is to include the separate optical plate layer in a camera lens part unit, which is described below.

Except for how the separate optical plate layer 538 is arranged in relation to the transparent protective layer 536, the other features may be as in FIGS. 3A-B and the image sensor 331. The effect with additional focus plane etc. is also the same. Hence, in FIGS. 5A-B and the image sensor 531 the separate optical plate layer 538 and the protective layer 536 together form an optical plate 537 with a first optical plate portion 534-1 and a second optical plate portion 534-2 that cover an image sensing area 533 of an image sensing part 335 of the image sensor 531. The first optical plate portion 534-1 corresponds to the portion of the image sensing area 533 not covered by the separate optical plate layer 538 and that thus is covered only by the transparent protective layer 536. Light incident on said first portion is refracted by, and travels through the thickness, named t1 539-1, of the transparent protective layer 536 to reach the image sensing area 533 of the image sensing part 535. In the shown example, the second optical plate portion 534-2 corresponds to the portion of the image sensing area 533 that is covered by the separate optical plate layer 538 and that thus is covered by both this layer and the transparent protective layer 536. Light incident on the second portion is refracted by, and travels through a, a layer with a thickness named t2 539-2, corresponding to thicknesses of both the separate optical plate layer 538 and the transparent protective layer 536, including also said space 544, before reaching the image sensing area 533 of the image sensing part 535.

Similar as the embodiments discussed above in connection with FIGS. 3A-C, the embodiments relating to FIGS. 5A-B may be implemented easily based on a prior art image sensor. Further, the gap, such as the space 544, enables a more flexible and changeable type of implementation, for example as described next.

Figure 5C:
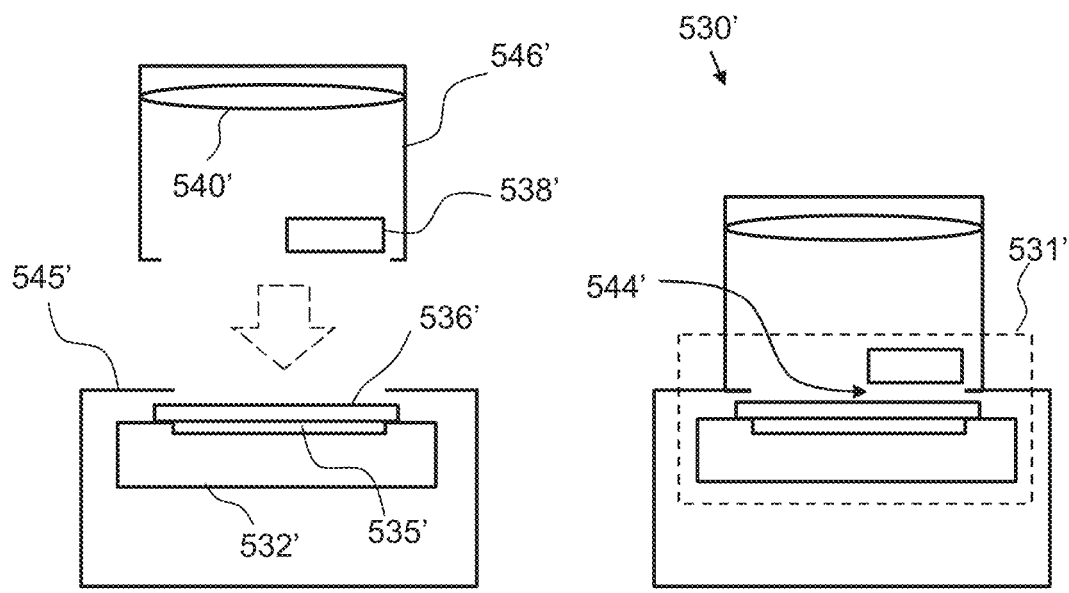
FIG. 5C schematically illustrates a camera system with a camera housing part and camera lens part that when attached to each other form a camera with an image sensor according to some embodiments herein.

FIG. 5C schematically illustrates a camera system comprising a camera housing part 545' and camera lens part 546' that when attached, or mounted, to each other, form a camera 530' with an image sensor 531' corresponding to the image sensor 530 discussed above but with a different holder arrangement. The camera lens part 546' comprise a lens 540' and a separate optical plate layer 538' corresponding to the separate optical plate layer 538. The camera housing part 545' comprises the image sensor 531' except the separate optical plate layer 538' thereof, and thus for example includes an image sensing part 535' with an image sensing area 533', a transparent protective layer 536' thereof and a support structure 532'. Hence, the part of the image sensor 531' comprised in the camera housing part 545' may correspond to a conventional image sensor.

The camera housing part 545' and camera lens part 546' are formed to fit each other and to be mounted together, preferably detachably and/or releasably mounted together, for example similarly as a lens to a housing of a system camera. When mounted together, the separate optical plate layer 538' shall be positioned in a desirable relation to the transparent protective layer 536', that is, with a predetermined space 544' between the layers and so that the separate optical plate layer 538' covers a desirable predetermined area, or portion, of the image sensing area 533, thus corresponding to the second optical plate portion 534-2. The portion of the image sensing area 533 non-covered by the separate optical plate layer 538' thus corresponds to the first optical plate portion 534-1.

It should be realized that embodiments based on the camera system and camera 530' of FIG. 5C enable one and the same camera housing, such as the camera housing part 545', with for example a conventional image sensor, to be used with several different lens parts. The different lens parts may differ by their separate optical plate layers, for example by their refractive properties, for example by different thickness of the layers and/or refractive indices of the materials of the layers, and/or what portion of the image sensing area 533' the layers cover. Each such different lens part, when mounted to the housing, may thus result in a predetermined additional second, focus plane associated with the portion of the image sensing area 533 that the separate optical plate layer covers. Another possibility is a lens part, such as the lens part 546', with adjustable and/or replaceable separate optical plate layer, such as the separate optical plate layer 538'. For example so that it can be adjusted to cover different pars and/or portions image sensing area 533', and/or be replaced with another having different refractive properties, such as thickness. The embodiments of FIG. 5C thus facilitate flexible implementation of embodiments herein and provision of a camera system that more easily can be adopted to different use cases and situations where embodiments herein are of interest to implement, without having to change or replace a whole camera. It should further be realized that such flexible system as described in connection with FIG. 5C also easily makes it possible to switch to a function of a conventional camera with only a single focus plane, for example by switching to a lens part without separate optical plate layer or just remove the separate optical plate layer from the lens part.

The embodiments discussed above have comprised one additional separate optical plate layer to simplify explanation. However, as should be realized, by applying the same principle that embodiments above are based on, it is of course possible with other and/or further optical plate layer (s) forming an optical plate, for example with different thicknesses, and/or that may comprise more than two optical plate portions so that more than two different focus planes are accomplished for one and the same camera and image sensor.

Moreover, although it may be preferred for simpler implementation with existing image sensors, the underlying principle of embodiments herein does of course not require that there must be a conventional transparent protective layer covering the image sensing area.

As should be realized, it is possible to form the two or more optical plate portions accomplishing two or more focus planes by using a great variety and combinations of optical plate layers and variations of materials and thicknesses of such layers. Some further examples in this direction will be discussed next.

FIGS. 6A-6D schematically illustrate different examples regarding alternatives to the above embodiments on how optical plate portions with different refractive properties can be accomplished for image sensors according to embodiments herein.

Figure 6A:
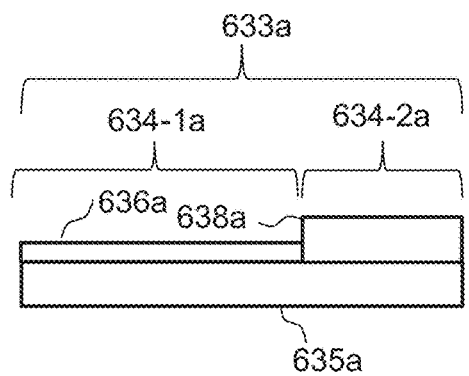
FIGS. 6A-6D schematically illustrate different examples regarding alternatives on how optical plate portions with different refractive properties can be accomplished for image sensors according to embodiments herein.

FIG. 6A is an example where first and second optical plate portions 634-1a, 634-2a, are formed by two separate transparent layers 636a, 638a of different thickness that cover separate portions of an image sensing area 633a of an image sensing part 635a. The separate layers 636a, 638a are of the same material but may alternatively be of different materials, for example materials of different refractive index.

Figure 6B:
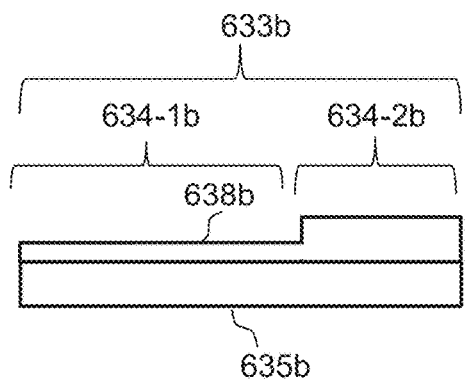

FIG. 6B is an example where first and second optical plate portions 634-1b, 634-2b, are formed by a transparent single layer 638b that covers an image sensing area 633b of an image sensing part 635b. Different thicknesses of the single layer 638b form the two optical plate portions 634-1b, 634-2b. The single layer is made of one and the same material.

Figure 6C:
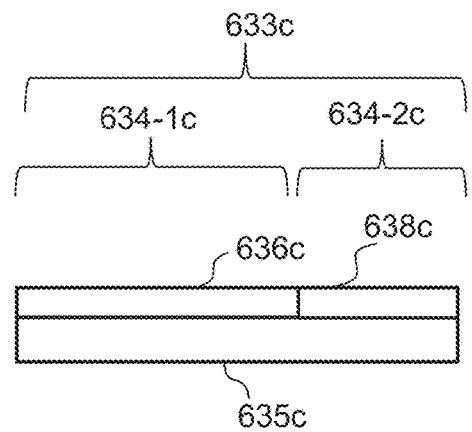

FIG. 6C is an example where first and second optical plate portions 634-1c, 634-2c, are formed by two separate transparent layers 636c, 638c of same thickness but made of materials of different refractive index and that covers separate portions of an image sensing area 633*c* of an image sensing part 635*c*.

Figure 6D:
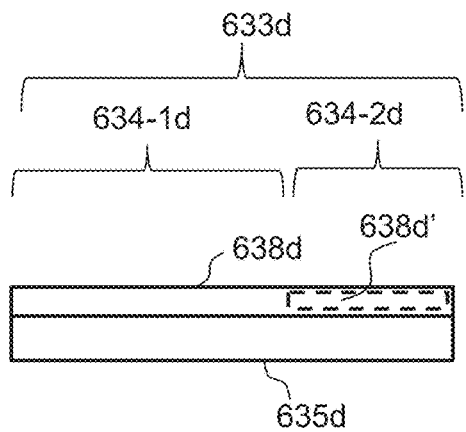

FIG. 6D is an example where first and second optical plate portions 634-1*d*, 634-2*d*, are formed by a transparent single layer 638*d* of equal thickness that covers an image sensing area 633*d* of an image sensing part 635*d*. The second optical plate portion 634-634-2*d* is here formed by that the different refractive properties are provided in a portion 638*d'* of the transparent single layer 638*d*, for example by that the single layer 638 is formed with a different material in this portion or by doping of the material in that portion, or by any other known means for accomplishing different refractive index in only a part of a transparent single layer.

Note that the examples herein on how optical plate portions with different refractive properties can be accomplished for image sensors according to embodiments herein, are just examples and several other ways and combinations are possible. Although not shown in any detailed examples and drawings, it should be noted that embodiments herein also comprise image sensors having not only one but two or more additional optical plate portions with different refractive properties covering different parts or portions of an image sensing area, thereby forming two or more additional focus planes. The skilled person that can implement an image sensor with two optical plate portions based on what is disclosed herein can easily also implement an image sensor with further optical plate portions to form further focus planes.

Embodiments regarding an image sensor such as discussed above will now be described more generally. The image sensor according to these embodiments, such as any of the image sensors 331; 531; 531', is for use with a lens, such as any one of the lenses 340; 540'. The lens is arranged to focus light onto an image sensing area, such as any one of the image sensing areas 333; 533 of said image sensor. Said image sensor comprises an optical plate, such as any one of the optical plates 337; 537 arranged to cover the image sensing area by at least two optical plate portions, such as the optical plate portions 334-1 and 334-2, or 534-1 and 534-2. The optical plate may be referred to as and/or correspond to an optical window or optical filter. The optical plate portions have different refractive properties such that light incident from said lens and refracted by said optical plate portions towards and onto the image sensing area will travel different distances to be in focus on the image sensing area depending on which of said optical plate portions the light was refracted by. As a result, image sensing area portions covered by said at least two optical plate portions become associated with different focus planes, for example the focus planes 351-1 and 351-2, or the focus planes 751-1 and 751-2.

Embodiments regarding a camera such as discussed above, for example any one of the cameras 330; 530'; 730, will now be described more generally. The camera comprises an image sensor according t embodiments, for example as described above and/or any one of the image sensors 331; 531; 531'. The camera also comprises said lens, such as any one of the lenses 340; 540'. In some embodiments of the camera, the separate optical plate layer, such as the separate optical plate layer 538', is stacked on the transparent protective layer, such as the transparent protective layer 536', with a gap or space, for example the space 544', separating the layers for avoiding that said layers are in direct physical contact with each other. The separate optical plate layer may in these embodiments be part of a separate lens part, or unit, such as the lens part 545', of the camera that comprise the lens and is releasably, and/or is configured to be releasably, mounted to a housing part, such as the housing part 546', of the camera and which housing part comprises the image sensing area, such as the image sensing area 533'.

As should be realized, an image sensor and camera according to embodiments herein and as described above, and for example as described in relation to FIGS. 3,5,6 may be used with an imaging system for light triangulation, such as the imaging system 305, with or without application of the Scheimpflug principle. An image sensor according to embodiments may also be used in other imaging system and/or cameras where further or more focus planes are desirable.

Figure 7A:
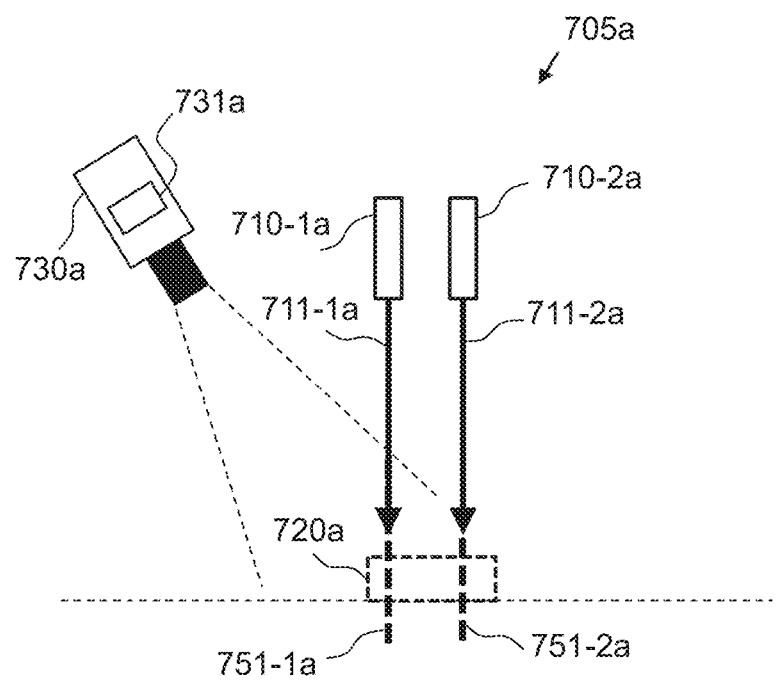
FIGS. 7A-B schematically illustrate simplified second and third examples of imaging systems according to some embodiments herein.
Figure 7B:
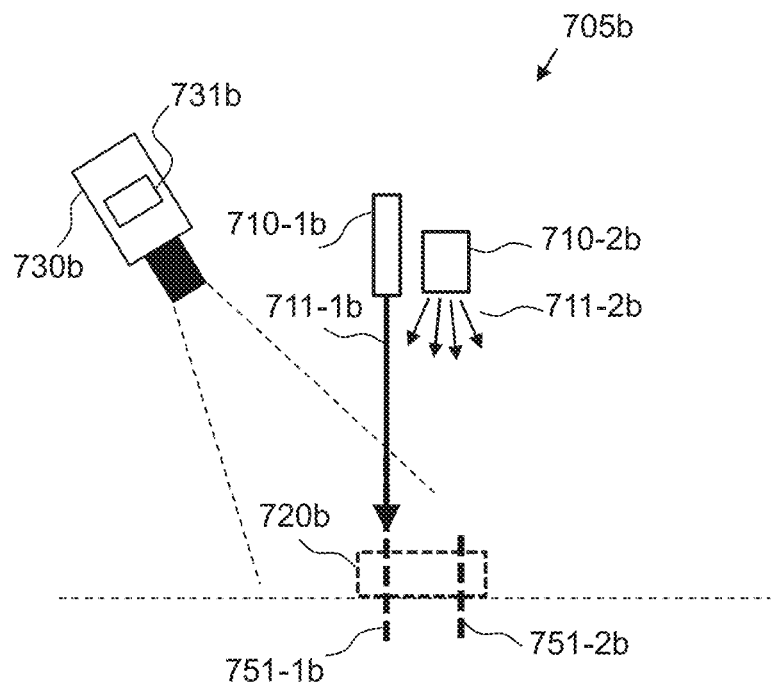

FIGS. 7A-B schematically illustrate simplified second and third examples of imaging systems 705*a*-*b* based on light triangulation. Each system comprises a camera with image sensor according to embodiments herein and the examples correspond to two different use cases. Attention will in the following be on differences compared to the imaging system 305 in FIG. 3C, that is, regarding what is new and differs in respective one of FIGS. 7A-B. Hence, corresponding parts shown also in FIG. 3C and/or discussed in relation to that figure may be the same in FIGS. 7A-B, if not stated otherwise or ruled out by some reason. In principle, the imaging systems 705*a*-*b* may be considered as two different extended versions of the imaging system 305 for different uses.

FIG. 7A schematically illustrates said imaging system 705*a* as a simplified second example of an imaging system according to some embodiments herein. It comprises a camera 730*a* with an image sensor 731*a* that may be or correspond to any image sensor according to embodiments herein, such as described above, and that with the camera 730*a* accomplishes two focus planes, a first focus plane 751-1*a* and a second focus plane 751-2*a*.

Similar as for the imaging system 305 of FIG. 3C there is a first light source 710-1*a* for illuminating an object 720*a* with first light 711-1*a*, typically laser light, as part of light triangulation for 3D imaging of the object 720*a*. The first light 711-1*a* is provided in the form of a light plane. The camera 730*a* and the image sensor 731*a* are arranged for sensing reflected first light from the object 720*a* as part of said light triangulation for the 3D imaging. The imaging system 705*a* is set up and configured based on the Scheimpflug principle so that the first focus plane 751-1*a* is co-located with, thus aligned, with the light plane corresponding to the first light 711-1*a*.

The main difference between the imaging system 705*a* and the imaging system 305 is that the imaging system 705*a* also comprises a further, second, light source 710-2*a* for illuminating the object 720*a* with second light 711-2*a* provided in the form of a light plane that is aligned with the second focus plane 751-2*a*. Hence, reflections from the object from both light planes can be in focus on the image sensor 731*a*. In some embodiments the second light 711-2*a* is the same type of light as the first light 711-1*a* but may differ in some respect in other embodiments.

The second light source may be illuminating an object 720*a* with the second light 711-2*a* as part of a further light triangulation for 3D imaging of the object 720*a*. That is, two different light triangulations for 3D imaging may be performed in parallel, one per light plane, using one and the same camera and image sensor. A total 3D imaging with scan of the object may thereby be performed faster. For example, the object 720*a* can thereby be scanned faster with a single camera and image sensor and it can even be possible to scan two separate objects at the same time. If the same portions of the object 720a are scanned twice, separated in time, by the two light planes provide by the first and second lights 711-1a, 711-2a. respectively, scan data from the two occasions can be used to improve measurements. Measurements can for example be improved by that it, thanks to embodiments herein, becomes possible to detect undesirable movements, such as movements lateral to a scan direction, of the object 720a, that is, lateral movement that may happen between scans by the two light planes.

An advantageous use may thus be for detection of undesirable movement of objects being scanned, for example object movements in the light plane between images of the same object. The same surface locations may be scanned by the two light planes separated in time and images be compared. If they differ, or differ too much according to tome predetermined criterium, this means there has been undesired movement of the object between the images. The movement can then be corrected for, or in any case it is valuable to know about that such movement has occurred. This kind of undesired movement can be a particular problem and/or be difficult to avoid in some application areas. For example, when large, heavy and/or irregular objects are to be scanned, such as tree logs and similar. If a log is laterally moving, such as tilting or rotating, between images it is not possible with only a single light plane to be able to know if such movement has occurred and the log may thereby according to the 3D imaging appear crooked although it is not. Conventionally, with a single light plane and focus plane, if a 3D image is formed, the log may thus falsely be considered to be crooked, although it is not, just because it has laterally moved during the scan when the light triangulation images were captured.

Note that in case of an additional light source, such as the second light source 710-2a, providing light for further light triangulation, such imaging system, for example the imaging system 705a, may be calibrated per light plane, for example separately with respect to each light plane. One light plane may be used at a time during the calibration.

FIG. 7B schematically illustrates said imaging system 705b as a simplified second example of an imaging system according to some embodiments herein. It comprises a camera 730b with an image sensor 731b that may be or correspond to any image sensor according to embodiments herein, such as described above, and that with the camera 730a accomplishes two focus planes, a first focus plane 751-1b and a second focus plane 751-2b.

Similar as for the imaging system 305 of FIG. 3C there is a first light source 710-1b for illuminating an object 720b with first light 711-1b, typically laser light, as part of light triangulation for 3D imaging of the object 720b. The first light 711-1b is provided in the form of a light plane. The camera 730b and the image sensor 731b are arranged for sensing reflected first light from the object 720b as part of said light triangulation for the 3D imaging. The imaging system 705b is set up and configured based on the Scheimpflug principle so that the first focus plane 751-1b is co-located with, thus aligned, with the light plane corresponding to the first light 711-1b.

The main difference between the imaging system 705b and the imaging system 305 is that the imaging system 705b also comprises a further, second, light source 710-2b for illuminating the object 720b with second light 711-2b. The second light source 710-2b and second light 711-2b are in these embodiments of different type than the first light source 710-1b and second light 711-2b, and does not relate to light triangulation as such. The second light 711-2b may be diffuse light as indicated in the figure. It may be provided by one or more Light Emitting Diodes, LED(s), that the second light source 710-2b thus may comprise and be based on. Diffuse light for example enables reflectance without laser speckles. Diffuse light is also closer to normally occurring illumination and may therefore be better to capture 2D image data about the object 720b than for example laser light or similar used as the first light 711-1b and for the light triangulation. The second light source 710-2b is arranged to direct the second light 711-2b so that is illuminates at least the second focus plane. Of course, the second light should not be directed and/or be provided such that it has detrimental interfering effect on first light in the first focus plane and thereby negative effect on the light triangulation. This is normally not a problem since light, such as the first light 711-1b, used in light triangulation is typically magnitudes more intense than what is needed to be used for the second light that additionally, since it is diffuse, is spread out over a larger area. Some shielding of light can of course also be applied if needed. Thanks to embodiments herein it is, at the same time as capturing images for the light triangulation, possible to capture, in focus, 2D image data about the object 720b, for example in order to extract information about its surface in addition to the 3D data about the object 720b obtained through the light triangulation. With knowledge of the offset distance, that is, the distance between the focus planes 751-1a,b it is possible to associate the obtained 2D data with corresponding 3D data, that is, relating to the same position on the object 720b. The second focus plane 751-2b can also be placed so close to the first focus plane 751-1b in some of these embodiments that the captured 2D data can be considered relevant for the 3D data captured at the same time, that is, in the same image.

Embodiments regarding an imaging system such as discussed above in relation to FIG. 7A-B will now be described more generally. The imaging system, such as any one of the imaging systems 305; 705; 730, is for 3D imaging of an object, for example any of the objects 320; 720, based on light triangulation. The imaging system comprises a camera according to embodiments herein, for example the camera that was generally described above or any one of the cameras 330; 530'; 730. The camera comprises an image sensor according to embodiments herein, for example the image sensor that was generally described above or any one of the image sensors 331; 531; 531'.

The imaging system may further comprise a first light source, such as an of the first light sources 310; 710-1, for providing first light, for example any one of the first lights 311; 711-1. The first light is in the form of a first light plane for illuminating said object as part of said light triangulation. The camera with the image sensor may be arranged in the imaging system for capturing reflected first light from the object as part of said light triangulation. The imaging system may be configured so that at least a first focus plane, such as any of the focus planes, 351-1; 751-1 of at least two focus planes, such as provided by the image sensor according to embodiments herein, is co-located with said first light plane.

The imaging system may further comprise an additional second light source, such as the second light source 710-2, for providing second light, for example the second light 711-2, for illuminating said object or another object. The camera with the image sensor may be arranged in the imaging system for capturing reflected second light from said object or said another object. The imaging system may further be configured so that another, second, focus plane, such as any of the second focus planes 351-2; 751-2 of said at least two focus planes, is located where said second light will be incident on and reflected by said object or said another object and thereafter be captured by the camera and the image sensor. In some embodiments, said second light is in the form of a second light plane, wherein said second focus plane is co-located with said second light plane.

Note that any enumerating terminology used herein, such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, that is, meaning "consist at least of".

The embodiments herein are not limited to the above-described embodiments. Various alternatives, modifications and equivalents may be used. Therefore, the above embodiments should not be taken as limiting the scope of the present disclosure, which is defined by the appending claims.

The invention claimed is:

1. An imaging system for three-dimensional imaging of an object based on light triangulation, comprising:
    a camera comprising:
        a lens; and
        an image sensor for use with said lens arranged to focus light onto an image sensing area of said image sensor, said image sensor comprising an optical plate, being an optical window or optical filter, arranged to cover the image sensing area by at least two optical plate portions with different refractive properties such that light incident from said lens and refracted by said optical plate portions towards and onto the image sensing area will travel different distances to be in focus on the image sensing area depending on which of said optical plate portions the light was refracted by, whereby image sensing area portions covered by said at least two optical plate portions become associated with different focus planes;
    a first light source for providing first light in the form of a first light plane for illuminating said object as part of said light triangulation, wherein the camera with the image sensor is arranged in the imaging system for capturing reflected first light from the object as part of said light triangulation, wherein the imaging system is configured so that at least a first focus plane of said at least two focus planes is co-located with said first light plane; and
    an additional second light source for providing second light for illuminating said object or another object, wherein the camera with the image sensor is arranged in the imaging system for capturing reflected second light from said object or said another object, wherein the imaging system is configured so that another, second, focus plane of said at least two focus planes is located where said second light will be incident on and reflected by said object or said another object and thereafter be captured by the camera and the image sensor.

2. The image sensor as claimed in claim 1, wherein the different refractive properties are caused by different thicknesses and/or by different refractive indices of materials that the optical plate portions are made of.

3. The image sensor as claimed in claim 1, wherein the image sensing area is covered by a transparent protective layer and wherein at least one of said optical plate portions are formed by a separate optical plate layer stacked on said transparent protective layer.

4. The image sensor as claimed in claim 3, wherein the transparent protective layer and the separate optical plate layer are made of material with the same refractive index.

5. The image sensor as claimed in claim 3, wherein the separate optical plate layer is attached to said transparent protective layer by an optical glue having a refractive index corresponding to the refractive index of the separate optical plate layer or the transparent protective layer.

6. The image sensor as claimed in claim 3, wherein the separate optical plate layer is stacked on the transparent protective layer with a space separating the layers and thereby avoiding that said layers are in direct physical contact with each other.

7. The imaging system as claimed in claim 3, wherein the separate optical plate layer is stacked on the transparent protective layer with a space separating the layers for avoiding that said layers are in direct physical contact with each other, and wherein the separate optical plate layer is part of a separate lens part of the camera mounted to a housing part of the camera that comprises the image sensing area.

8. The imaging system as claimed in claim 1, wherein said second light is in the form of a second light plane and said second focus plane is co-located with said second light plane.

* * * * *